United States Patent Office 2,930,775
Patented Mar. 29, 1960

2,930,775

PIGMENT PASTES CONTAINING WATER-SOLUBLE DIISOBUTYLENE-MALEIC ANHYDRIDE COPOLYMER SALTS

David B. Fordyce, Moorestown, N.J., Charles L. Levesque, Philadelphia, Pa., and Warren D. Niederhauser, Huntsville, Ala., assignors to Rohm & Haas Company, Philadelphia, Pa., a corporation of Delaware No Drawing. Application October 14, 1958
Serial No. 767,086

8 Claims. (Cl. 260—29.6)

This invention deals with aqueous dispersions of pigments, including extender pigments, particularly dispersions of such pigments in the form of aqueous pastes which are suitable for addition to aqueous resin dispersions to form water-base coating compositions. More specifically this invention concerns aqueous pigment pastes in which finely divided pigment (including organic as well as inorganic pigments, especially carbon black and calcium hydroxide which are difficult to disperse) is maintained in a dispersed state with a small amount of a water-soluble salt of a low molecular weight, relatively homogeneous copolymer of maleic anhydride and diisobutylene of the formula $H_3CC(CH_3)_2CH_2C(CH_3)=CH_2$. This application is a continuation-in-part of copending applications Serial Nos. 373,660; 373,661; and 373,662, all filed August 11, 1953, and all now abandoned.

The need for well dispersed pigments has long been recognized. For this purpose various agents have been proposed. Of these but few exhibit a high order of activity and then usually activity is confined to a narrow class of solids. As a rule, dispersants are quite specific in their action, any given agent providing dispersing activity with a rather limited number of specific pigments and being markedly less effective or even ineffective with others. Some materials acting as dispersants for some specific substance may be agglomerants for other substances.

There is thus a real need for dispersants which provide a high dispersing action for as many common pigments as possible and which at the same time will not exhibit incompatibilities with other pigments or other ingredients which are to be mixed therewith. The copolymers herein described have been found to possess this desirable combination of properties, acting on a great variety of pigments with good efficiency to provide dispersions useful in many types of applications and particularly for incorporation into water-base coatings.

Various copolymers of maleic anhydride and olefinically unsaturated bodies, including hydrocarbons, are known. They have been used, for example, in coatings, as agglomerating agents, and as binders. For purposes of agglomerating or binding it is necessary that the copolymers have high molecular weights, for example, of the order of 30,000 to 150,000, and in any case of more than 10,000.

Copolymers of this type have been the more usual. But it has also been shown that copolymers of lower molecular weight can be made. These were suggested for specific types of coatings, as tanning agents, gelatin substitutes, protein hardeners, and the like.

The more usual copolymers of maleic anhydride and unsaturated bodies have, however, been those of high molecular weight. These have been used in conjunction with solids as binding and coating agents, sometimes in organic systems. If the high molecular weight copolymers are rendered water-soluble, they still act as binding agents. While they can be mixed with finely divided solids, they are not highly efficient dispersants. Before a sufficient amount of such material can be added to give good dispersion in a pigment paste, a viscous composition results. The dispersing efficiency of copolymers useful for binding is low.

It was surprising, therefore, to discover that fluid pastes of high solids content and low water content could be prepared by incorporating in a mixture of pigment, particularly one or more inorganic pigments, and water a relatively small amount of a water-soluble salt from a copolymer of maleic anhydride and diisobutylene, which copolymer has a molecular weight of less than about 5,000 and which is relatively homogeneous, as shown by relation of molecular weight and viscosity of solutions thereof. The amount of salt of a low molecular weight, homogeneous copolymer effecting dispersion of solid and fluidity of the pigment paste will usually not be over three percent of the weight of inorganic pigment and may be as low as about 0.05%. The preferred amounts for most pigments are usually from 0.1% to 1%. However, with carbon black and calcium hydroxide the proportions are generally between 0.5% and 4%. With carbon black, the preferred proportion is usually between 2% and 3%; whereas with calcium hydroxide, the preferred proportion is generally between 1.5% and 2%. In this respect also the pigment pastes of this invention differ from previously known coating and binding copolymers, providing highly efficient dispersing action at such low concentrations that well dispersed pigment pastes are obtained long before any thickening effect is imparted from a high concentration of copolymer.

The pastes here prepared will have a pH value of at least 4.5 and preferably above seven. The range of seven to eleven is preferred, although pastes at pH 12 can be prepared which provide excellent dispersion of solids.

It is best to prepare pigment pastes with a solids content from 50 to 85% and preferably 60 to 85%, as high a proportion of pigments being used as will permit fluidity. With carbon blacks, however, the more usual solids content is generally in the range of 20 to 50%. There will thus be at least 15% water in a paste, the water being sufficient in any case to produce a fluid paste. It is noteworthy that fluidity can be achieved at such solid contents. This is a result which has not heretofore been practical in many cases and not possible in others yet has been much desired.

The copolymers as used can be considered in most cases as being made up of units composed of the maleic group and a group R from the diisobutylene, such as

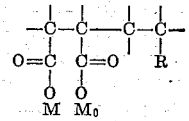

where M and $M_0$ are cations giving water-soluble carboxylates with a pH in water of at least 4.5. When ammonia or amines are used for neutralization, either di-salts or mono-salts of the half-amide (maleamic acids) can be formed depending upon the conditions of neutralization (the mono-salts of half-amides generally being formed at temperatures from room temperature up to 50° C. to 70° C. and the di-salts being formed at higher temperatures) and both types are useful herein. Methods for copolymerizing maleic anhydride and diisobutylene are sufficiently described in the art. Diisobutylene, which does not tend to form polymers by itself, reacts with maleic anhydride in a 1:1 mole ratio in the presence of a polymerizing catalyst or initiator to form without particular precaution copolymers of low molecular size or of a low degree of polymerization. These are particularly desirable copolymers because they can readily be prepared in a relatively homogeneous state. An initiator such as benzoyl peroxide, lauroyl peroxide, cumene hydroperoxide, tert-butyl perbenzoate, or the like can be used.

Thus, copolymers can be prepared with molecular weights from 750 to 5,000. The molecular weights found will, of course, be average values. In this range of molecular sizes, it is possible to determine apparent molecular weights from colligative properties, such as boiling point elevation. But not all preparations of copolymers which have apparent molecular weights within the required range are efficient dispersants for pigments.

Molecular weights can be readily determined from boiling point elevation by any method in which relatively small temperature differences can be accurately measured. A suitable method is based on use of the Menzies-Wright ebulliometer, particularly as modified by Hanson and Bowman, Analytical Edition (Ind. Eng. Chem. 11, 440 (1939)). Sensitivity and accuracy are further improved by use of a thermocouple in place of the vapor thermometer. The potential differences may be electronically amplified and recorded, if so desired, there being a number of amplifiers or electronic potentiometers and recorders available for this purpose. Acetone is a suitable solvent for dissolving samples of the copolymers. Extraneous factors can be eliminated by standardizing the method with benzil and by comparing substances of unknown molecular weight to it.

It has been found that efficient dispersants of the type here discussed must also have a homogeneity which is measured by the relationship of apparent molecular weight and viscosity by solutions. Thus, a copolymer for use as an efficient dispersant must not impart a viscosity of more than 1,000 cps. at 25° C. to solutions of its anhydride form at concentrations of 35% in an organic solvent such as dioxane or methyl ethyl ketone. This requirement eliminates mixtures of copolymers which contain some very large molecules and sufficient monomer and/or sufficient very low polymer to bring the apparent molecular weight to a range which might appear to be useful, such heterogeneous mixtures having been found not to be efficient. By the same token unreacted starting materials should be absent or removed, as by stripping under reduced pressure and/or washing with water. The term homogeneous is here used to define copolymers meeting the above requirements; that is with a narrow distribution of copolymer sizes.

The defined copolymers of maleic anhydride and diisobutylene are taken up in water and treated with sufficient base, such as an alkali metal hydroxide, carbonate, or bicarbonate or ammonium hydroxide or the eyuivalent including quaternary ammonium and amine bases, to yield a soluble salt form which gives a pH of at least 4.5. When ammonium hydroxide is used, the salt formed may contain amide units as well as ammonium salt units. The copolymers are most conveniently used in solution, but for purposes of handling and shipping, the salts may be prepared in a solid form, in which case it is best to dissolve them prior to forming pigment pastes.

The defined copolymers are more effective dispersing agents for a greater variety of finely divided solids than any commercial products available up to the time of this research work. At a given solids content they give pastes of greater fluidity and with some solids they give fluid pastes with higher solids content than has heretofore been possible.

The copolymers of maleic anhydride and diisobutylene have inherently an optimum balance of hydrophobic and hydrophilic groups for intended applications. They are effective dispersants for an unusually wide variety of solid particles. They are highly effective with these in low proportions. Since the copolymers are essentially colorless, they do not impart color or off-colors. They are low in cost.

As inorganic white pigments and extender pigments there may be mentioned white lead, zinc oxide, titanium pigments, lithopone, other zinc sulfide pigments, barium sulfate, calcium carbonate, silica, talc, mica, and clays, such as china clay. Pigment pastes normally comprise one or more of these or equivalent pigments. There may also be used one or more insoluble, inorganic or organic pigments, such as an iron oxide, carbon black, cadmium sulfide, toluidene red, lithol toner, chrome orange, chrome yellow, Hansa yellow, chrome green, phthalocyanine green, phthalocyanine blue, etc. When a hydrophobic color is to be used, such as a Hansa yellow, it should be first wet with a solution containing a small amount of a wetting agent, an agent such as a sulfated alcohol, sulfonated alkylbenzene, sodium alkylphenoxypolyethoxyethyl sulfonate, or alkylphenoxypolyethoxyethanol, for the copolymers used in this invention are not wetting agents and do not exhibit significant capillary activity. Valuable dispersions of calcium hydroxide can also be made. A wide variety of carbon blacks has been found to respond to the dispersing action of the defined copolymers in salt form. Gas blacks are of primary importance and of these furnace blacks are of particular interest. Yet lamp blacks respond to the dispersing action as well as acetylene black. As the particle size of these various blacks decreases, the amount of dispersant to give a maximum effect, in general, increases.

The term pigment is here used to cover a powder or powdered substance which is mixed with liquids to form paints, enamels, other coating compositions, or the like, which are insoluble therein, and which provide covering, hiding, filling, and/or coloring action. Since aqueous suspensions or dispersions of pigments are here dealt with, it is necessary that the dispersed pigments be insoluble in water. They are, of course, in the finely divided forms which are provided in commerce. Pigments are frequently ground or precipitated in a form to pass a 325 mesh screen.

For the preparation of pigment pastes, as has been indicated, it is generally most convenient to prepare an aqueous solution of copolymer in salt form. Concentrations of 5 to 40% may be used, although those of 10 to 20% are usually preferred. Pigment, water, and solutions are mixed. If desired, the paste or suspension may be ground in a mill—a pebble mill, roll mill, colloid mill, or high speed stone mill, or in some instances a high shear mixer being suitable. Sufficient copolymer is used to ensure good dispersion and fluidity of the paste. The optimum amount of copolymer will depend upon the specific pigment or pigments and upon the state of subdivision thereof. In general, the finer the particle size the more dispersing agent should be used. Concentrated pastes can be extended to give dilute pastes, when the latter are needed.

Calcium hydroxide or so-called hydrated lime can be dispersed in water with the aid of the water-soluble salts of copolymers of maleic anhydride and diisobutylene having a molecular weight of 750 to 5,000, to give pastes or suspensions which are smooth, uniform, stable, and fluid. Furthermore, fluid pastes can thus be prepared with a higher solids content than has heretofore been possible. This is of advantage in handling, pumping, transporting, and using slurries of calcium hydroxide. These are useful for coatings as white-wash, field markings, or the like. They are also useful as concentrated alkaline reagents in chemical manufacturing.

The carbon black dispersions of this invention will have a pH between 7 and 12 and preferably between 9 and 11. When a dispersion of carbon black formed at an alkaline pH is brought to a lower pH, the dispersed carbon can be released or "precipitated." This is of considerable importance, for example, in the compounding of rubbers in latices. The dispersions of carbon blacks in aqueous media are useful in the fields of paper, cement, water-base paints, coating compositions, inks, rayons, and rubber.

Fluidity titration tests were made with hydrated lime with different copolymer salts as dispersants. In these tests hydrated lime and water were mixed to form a stiff paste, which was titrated with small increments of an aqueous 10% solution of a copolymer salt until fluidity resulted. The mixture was stirred after each increment with a high speed mixer and examined for fluidity. The average solids content in these tests was 53%. Fluid pastes were prepared containing 1.5 to 2.0% of the sodium salts of copolymers of maleic anhydride and diisobutylene, the anhydrides having number average molecular weights of about 750, 1,000, and 4,000, and having viscosities as 35% solutions in dioxane of 32, 100, and 560 cp. at 25° C. respectively. These pastes, even after storing for six months, were still fluid after being restirred. Yet when these pastes are diluted and applied as white-wash to concrete surfaces, films form which rapidly become water-resistant. Without addition of one of the above-defined copolymer salts, pastes of hydrated lime lose fluidity at 40 to 45% solids. With a few percent of one of these salts, however, fluid pastes are obtained up to 55 to 60% solids.

Fluidity titration tests were made with a high abrasion furnace black, having a particle size of about 0.036 micron and giving a pH of 9.5 in aqueous suspension, using different copolymer salts as dispersants. In these tests carbon and water were mixed to form a stiff paste, which was titrated with small increments of an aqueous 10% solution of a salt until fluidity resulted. The mixture was stirred after each increment with a high speed mixer. At the apparent end point the paste was stirred for two minutes and left standing for five minutes. If fluidity was not then maintained, titration was continued with small increments until fluidity could be so maintained. The average solid content of the resulting paste was 24%. Fluidity was obtained at the following percentages of dispersant based on the weight of carbon: 2.5% with the Na salt form of a 1:1 copolymer of maleic and diisobutylene giving a pH of 11.3, and having a number average molecular weight of about 750, and imparting to a 35% solution of the copolymer in anhydride form in dioxane a viscosity of 32 cp. at 25° C.; 2.2% with the Na salt form of a 1:1 copolymer of maleic and diisobutylene giving a pH of 11.7, and having a number average molecular weight of about 1,000, and imparting to a 35% solution of the copolymer in anhydride form in dioxane a viscosity of 100 cp. at 25° C.; 2.8% with the Na salt form of a 1:1 copolymer of maleic and diisobutylene giving a pH of 11.0, and having a number average molecular weight of about 4,000, and imparting to a 35% solution of the copolymer in anhydride form in dioxane a viscosity of 560 cp. at 25° C.; 2.2% with the K salt form of a 1:1 copolymer of maleic and diisobutylene giving a pH of 9.8 and imparting to a 35% solution of the copolymer in anhydride form in dioxane a viscosity of 125 cp. at 25° C.; 2.2% with the ammonium salt form of a 1:1 copolymer of maleic and diisobutylene giving a pH of 9.8 and imparting to a 35% solution of copolymer in anhydride form in dioxane a viscosity of 130 cp. at 25° C.

The maximum amount of carbon black which can be incorporated into a fluid paste will, as has been explained, depend upon particle size. In general, this amount is 30 to 40% for furnace blacks with amounts up to 3.5% of a salt from a defined copolymer being used. Coarser carbon blacks permit going to a total solids of about 50% in a fluid paste.

In the study of the dispersants and the following pigment pastes rheological measurements were made with a stormer viscosimeter which had been modified as suggested by Fischer and Lindsley (Textile Res. J. XVIII, 325, 1948). Weighed amounts of solid and water were treated with a solution of a dispersing agent, usually for convenience at 10% and at a pH of 9.5. Each mixture was stirred for five minutes and left standing for 16 hours, care being taken to keep containers capped to prevent loss of moisture. The mixture was then stirred for five minutes and brought to a constant temperature, 30°

C. Measurements were made in the conventional way. With good dispersions the instrument quickly came to equilibrium and essentially identical rate of shear-shear force curves were obtained for increasing or decreasing loads. For undispersed or poorly dispersed suspensions equilibrium was reached, if at all, with considerable difficulty. Typical data are summarized in the following tables.

In successive columns therein there are shown the particular copolymer studied, the percent of copolymer based on the weight of the pigment, the percent of pigment in the mixture, the weight required to give 300 r.p.m. at 30° C., the apparent viscosity of the suspension, and the yield point, if any. Where the yield point is shown as less than 10 grams, it can be considered that there is no yield point and the flow is dilatant. The friction of the instrument required two to three grams.

TABLE 1

*Zinc oxide suspensions*

| Kind | Copolymer, Percent | Pigment, Percent | Weight, g. | Viscosity, poises | Yield point, g. |
|------|------|------|------|------|------|
| None | | 32 | 431 | 0.15 | ca. 400 |
| A | 0.25 | 70 | 30.0 | 0.16 | <10 |
|   | 0.375 | 70 | 32.5 | 0.17 | <10 |
|   | 0.50 | 70 | 33.0 | 0.18 | <10 |

Copolymer A was derived from equimolar proportions of maleic anhydride and diisobutylene, the copolymer having a molecular weight of about 1,000 (number average). The viscosity of a 35% solution of this copolymer in anhydride form in dioxane was 100 cps. at 25° C. The copolymer was converted to a sodium salt, a 10% solution thereof having a pH of 9.5.

In these viscosity determinations there were used a cup of 1.375 inches diameter and a bob having a diameter of 1.232 inches and a height of 1.388 inches.

TABLE 2

*Red iron oxide suspensions*

| Kind | Copolymer, Percent | Pigment, Percent | Weight, g. | Viscosity, poises |
|------|------|------|------|------|
| None | | 30 | 96 | 0.14 |
| A | 0.25 | 60 | 32 | 0.17 |
|   | 0.375 | 60 | 37 | 0.20 |
|   | 0.5 | 60 | 39 | 0.22 |

The yield point of the control, the sample without copolymer and with only 30% pigment, was about 70 grams. The pigment pastes containing the copolymer salt had no measurable yield point, values of less than 10 grams being found, or less than the lowest measurable value at 60% pigment content.

It might be noted that this iron oxide was of very fine particle size (less than 0.1 micron). This fact limited the amount of pigment which could be used in a fluid paste. Oxides with coarser particles can be used in pastes at higher solids with retention of fluidity with any of the defined copolymer salts.

TABLE 3

*Calcium carbonate suspensions*

| Kind | Copolymer, Percent | Pigment, Percent | Weight, g. | Viscosity, poises | Yield point, g. |
|------|------|------|------|------|------|
| None | | 70 | 440 | 0.62 | ca. 340 |
| A | 0.125 | 75 | 148 | 0.91 | <10 |
|   | 0.25 | 75 | 124 | 0.76 | <10 |
|   | 0.375 | 75 | 125 | 0.77 | <10 |
|   | 0.50 | 75 | 167 | 1.03 | <10 |

The above calcium carbonate has a particle size of about two microns.

TABLE 4

*Barium sulfate suspensions*

| Kind | Copolymer, Percent | Pigment, Percent | Weight, g. | Viscosity, poises | Yield point, g. |
|---|---|---|---|---|---|
| None | | 40 | 190 | 0.24 | ca. 140 |
| A | 0.18 | 70 | 24 | 0.12 | <10 |
| | 0.25 | 70 | 24 | 0.12 | <10 |
| | 0.25 | 75 | 30 | 0.16 | <10 |
| | 0.25 | 80 | 61 | 0.35 | 10 |

TABLE 5

*Kaolin suspensions*

| Kind | Copolymer, Percent | Pigment, Percent | Weight, g. | Viscosity, poises | Yield point, g. |
|---|---|---|---|---|---|
| None | | 35 | 116 | 0.12 | ca. 95 |
| A | 0.125 | 65 | 40 | 0.22 | <10 |
| | 0.18 | 65 | 30.5 | 0.16 | <10 |
| | 0.25 | 65 | 31.5 | 0.17 | <10 |

The kaolin used above had an average particle size of one to two microns with about 9% less than 0.2 micron.

Fluidity titration data given in the following Tables 6 and 7 were obtained from a variety of pigments with different copolymers. In this method of test a paste of pigment was titrated with small increments of an aqueous 10% solution of a salt from a copolymer until fluidity resulted. The mixture was stirred after each increment with a high speed mixer for about a half-minute and examined for fluidity. Typical titration data are summarized in Table 6, where there are shown in the first column various pigments and in succeeding columns under each copolymer (1) the percent of copolymer on pigment and (2) the final percent of pigment in each mixture. This percent of pigment is not, however, the highest which can be reached with retention of fluidity.

TABLE 6

*Fluidity titration data*

| Pigment | Copolymer $A^1$ | | Copolymer $A^2$ | | Copolymer $A^3$ | |
|---|---|---|---|---|---|---|
| | Percent $A^1$ | Percent Solid | Percent $A^2$ | Percent Solid | Percent $A^3$ | Percent Solid |
| Blanc Fixe | 0.14 | 77 | 0.14 | 77 | 0.14 | 77 |
| $CaCO_3$ | 0.06 | 71 | 0.06 | 71 | 0.06 | 71 |
| Iron oxide, red | 0.17 | 58 | 0.20 | 58 | 0.20 | 58 |
| Kaolin | 0.14 | 69 | 0.14 | 69 | 0.14 | 69 |
| Zinc oxide | 0.20 | 69 | 0.20 | 69 | 0.22 | 69 |

All of the above copolymers were prepared from equimolar amounts of maleic anhydride and diisobutylene. Copolymer $A^1$ has a molecular weight of about 1,000; $A^2$ of about 750; $A^3$ of about 4,000. Viscosities at 25° C. of 35% solution in dioxane are 100 cps., 32 cps., and 560 cps. at 25° C., respectively. The copolymers are all used in the form of sodium salts. Ammonium salts give at least as favorable results.

TABLE 7

*Comparison fluidity data*

| Pigment | Product I | | Product II | | Copolymer $A^1$ | |
|---|---|---|---|---|---|---|
| | Percent I | Percent Solid | Percent II | Percent Solid | Percent $A^1$ | Percent Solid |
| Calcium magnesium carbonate | 0.12 | 70 | 0.10 | 70 | 0.06 | 71 |
| China clay | 0.40 | 68 | 0.66 | 67 | 0.40 | 68 |
| Chrome oxide | >2 | <71 | 0.24 | 82 | 0.24 | 82 |
| Lead oxide | 1.09 | 65 | 0.20 | 69 | 0.14 | 69 |
| Titania on $CaSO_4$ | >3 | <62 | 3.40 | 58 | 0.76 | 68 |

Product I is a sodium polyphosphate, which is an excellent dispersant for many solids, but is sensitive to pH, and heat.

Product II is a much used, commercial sulfonate, generally considered to give high dispersing activity.

The effectiveness of the copolymers of maleic anhydride and diisobutylene may also be demonstrated with data showing the maximum amount of a given pigment which may be taken up in water to form a paste having some degree of fluidity. The maximum is determined chiefly by the particular pigment examined and its particle size. As size decreases, surface area, of course, increases and use of somewhat more dispersant becomes necessary, particularly to reach an optimum state of dispersion.

Pastes of typical pigments were made in water and the maximum of pigment determined at which fluidity was observed. With blanc fixe the maximum was 80 to 85%, 0.25% of the disodium salt from a copolymer of maleic anhydride and diisobutylene being used. With zinc oxide (U.S.P. XII) the limit was likewise 80 to 85% at 0.25% of the same salt. With kaolin a limit of 70 to 75% was found, also at 0.25% of the same salt. A limit of 80 to 85% of calcium carbonate was found where the particle size was two microns, 0.25% of the same salt also being used. With a calcium carbonate having a particle size of 0.2 micron, however, the upper limit was reached at 70 to 75% and an increase to 1% of the dispersant salt was found desirable. Almost identical data are obtained when other defined copolymers are substituted for that used above.

The defined copolymers are highly effective, as has been shown, against a great variety of pigments. For this reason they are particularly desirable in the preparation of the usual pigment pastes which are employed in coatings, since these are desirably composed of a number of pigments. A typical formulation comprises 250 parts of a titanium oxide pigment of the rutile type, 75 parts of lithopone, and 150 parts of mica. To this mixture there is added 1.3 parts of the sodium salt from a copolymer of maleic anhydride and diisobutylene having a molecular weight of about 2,000. The mixture is quite fluid with enough water to give a paste of 65 to 70% solids. This is an entirely suitable pigment paste for addition to latices of copolymers, such as styrene and butadiene, vinyl acetate, acrylic resins, or other film-forming water-base resinous vehicles. Because of the efficiency of dispersion of the various solids in the pastes a higher ratio of pigment to binder can be safely used than has heretofore been practical. This is of particular importance in the coating of paper.

Other typical formulations for pigment pastes suitable for use in water-base paints are:

```
                                                   Parts
A. Rutile titanium dioxide _____ 250
   Lithopone _____  75
   Clay _____ 141
   Water _____ 202
B. Rutile titanium dioxide _____ 250
   Lithopone _____  75
   Calcium carbonate _____ 148
   Water _____ 192
C. Rutile titanium dioxide _____ 250
   Lithopone _____  75
   Talc _____ 147
   Water _____ 211
```

The pigment paste is treated with an aqueous solution of 1.2 to 1.5 parts of a sodium, potassium or ammonium salt from a homogeneous 1:1 copolymer of maleic anhydride and diisobutylene of correct molecular size and viscosity to give pastes useful for pigmenting a resinous dispersion. The pigment paste can readily be used with pigment/binder ratios from 1:2 to 4:1 with good dispersions of resins to give smooth, even coatings. For sealers on porous surfaces and for paper coatings pigment/binder ratios up to 20:1 and even 30:1 are feasible, where, as here, the pigment pastes are effectively and efficiently dispersed.

Colored pigment pastes are illustrated by the following formulation:

| | |
|---|---:|
| Rutile titanium dioxide | 15.0 |
| Lithopone | 75.0 |
| Clay | 200.0 |
| Talc | 50.0 |
| Toluidine red | 10.0 |
| Red iron oxide | 100.0 |
| Dispersant | 1.7 |
| Diethylene glycol | 13.2 |
| Anti-foamer | 1.2 |
| Water | 112.5 |
| Total parts | 578.6 |

The dispersant was the sodium salt from the copolymer of maleic anhydride and diisobutylene, having a molecular weight of about 1,000 and giving a viscosity in a 35% solution in dioxane of 100 cps. at 25° C. This pigment paste was readily taken up in aqueous suspensions of resins to give water-base paints of good properties.

The pigment pastes of this invention are characterized by excellency of dispersion of inorganic pigments with or without colored pigments in a small amount of water. The high solids content of these pastes, between 50 and 85%, is attained with retention of fluidity. This desirable result is achieved with the aid of low molecular weight, homogeneous copolymers of maleic anhydride and diisobutylene which are converted to a salt form giving a pH of at least 4.5 and preferably of at least 7. The copolymers must have molecular weights below 5,000. They are used in amounts of 0.05% to 3% of the weight of the pigments except in the cases of carbon black and calcium hydroxide for which the amounts of copolymer salts desired may in some cases be as high as 4%.

The pigment pastes meeting the above requirements are readily and effectively incorporated into aqueous resin dispersions. They permit the fullest utilization of the hiding and covering power of pigments and pigment extenders. They bring out the maximum color of colored pigments. They provide better uniformity of pigment mixtures. They permit use of a higher pigment concentration in aqueous base coatings than has heretofore been possible.

We claim:

1. A pigment paste comprising an aqueous suspension of finely divided water-insoluble pigment dispersed with at least about 0.05%, on the weight of pigment, of a polymeric dispersant consisting of a water-soluble salt selected from the group consisting of ammonium and alkali metal salts of a polymeric material selected from the group consisting of a relatively homogeneous copolymer, having a molecular weight between 750 and 5,000, of maleic anhydride and diisobutylene in approximately equimolecular proportions and mixtures of such copolymers, said polymeric material imparting to a 35% solution in an organic solvent therefor selected from the class consisting of dioxane and methyl ethyl ketone a viscosity less than 1,000 centipoises at 25° C., the suspension having a pH of at least 4.5 to 12.

2. As a composition of matter, a suspension of finely particled water-insoluble pigment in water, said pigment being dispersed with at least 0.05% to 4%, on the weight of pigment, of a polymeric dispersant consisting of a water-soluble salt selected from the group consisting of ammonium and alkali metal salts of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C., the suspension having a pH between 7 and 11.

3. As a composition of matter, a fluid paste of finely particled water-insoluble pigment in water, said pigment being present in said paste in an amount up to 85% by weight of the paste, and being dispersed with at least 0.05% of the weight of pigment of a polymeric dispersant consisting of a water-soluble salt selected from the group consisting of ammonium and alkali metal salts of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C., said suspension having a pH between 7 and 11.

4. As a composition of matter, a suspension of finely divided water-insoluble inorganic pigment dispersed in water with a dispersing amount between 0.05% and 1% based on the weight of the pigment of a polymeric dispersant consisting of a salt selected from the group consisting of ammonium and alkali metal salts of a polymeric material selected from the group consisting of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C., said suspension having a pH between 7 and 11.

5. As a composition of matter, an aqueous dispersion of carbon black having a pH from 7 to 12, said carbon black being dispersed by 0.5% to 4%, on the weight of carbon black, of a polymeric dispersant consisting of a water-soluble salt selected from the group consisting of ammonium and alkali metal salts of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C.

6. As a composition of matter, an aqueous dispersion containing up to 60% by weight of finely divided calcium hydroxide and having a pH in the range of 7 to 12, said hydroxide being dispersed with 0.5% to about 4% by weight, on the weight of the hydroxide, of a polymeric dispersing agent consisting of a water-soluble salt selected from the group consisting of ammonium and alkali metal salts of a polymeric material selected from the group consisting of a copolymer, having a molecular weight between 750 and 5,000, of a mixture consisting of maleic anhydride and diisobutylene in approximately equimolecular proportions and mixtures of such copolymers, said polymeric material giving a viscosity of less than 1,000 cps. at 25° C. in a 35% solution in an inert organic solvent therefor selected from the class consisting of dioxane and methyl ethyl ketone.

7. As a composition of matter, a suspension of finely particled water-insoluble pigment in water, said pigment being dispersed with at least 0.05% to 4%, on the weight of pigment, of a polymeric dispersant consisting of a water-soluble sodium salt of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C., the suspension having a pH between 4.5 and 12.

8. As a composition of matter, a suspension of finely particled water-insoluble pigment in water, said pigment being dispersed with at least 0.05% to 4%, on the weight of pigment, of a polymeric dispersant consisting of a water-soluble ammonium salt of a homogeneous copolymer, having a molecular weight between 750 and 5,000, of maleic anhydride and diisobutylene in approximately equimolecular proportions and mixtures of such copolymers, said polymeric material imparting to a 35% solution thereof in an organic solvent therefor selected from the class consisting of dioxane and methyl ethyl ketone a viscosity less than 1,000 centipoises at 25° C., the suspension having a pH between 4.5 and 12.

No references cited.